United States Patent [19]
Modebadze

[11] 3,847,628
[45] Nov. 12, 1974

[54] METAL-TO-GLASS JOINT

[76] Inventor: Otar Egorovich Modebadze, ulitsa Merkviladze, 2/49, Tbilisi, U.S.S.R.

[22] Filed: Apr. 9, 1973

[21] Appl. No.: 349,671

[52] U.S. Cl.................................. 106/52, 106/48
[51] Int. Cl........................... C03c 3/30, C03c 3/10
[58] Field of Search................................ 106/48, 52

[56] References Cited
UNITED STATES PATENTS

| | | | |
|---|---|---|---|
| 2,861,010 | 11/1958 | Axelrod et al. | 106/48 X |
| 2,929,727 | 3/1960 | Oldfield et al. | 106/52 |
| 2,948,992 | 8/1960 | Oldfield et al. | 106/52 X |

*Primary Examiner*—Helen M. McCarthy
*Attorney, Agent, or Firm*—Eric H. Waters

[57] ABSTRACT

The invention relates to glass industry. A glass containing silicon dioxide, aluminum oxide, zirconium dioxide, strontium oxide, sodium oxide, potassium oxide, tungsten trioxide, lanthanum oxide and calcium oxide is thermally sealed together with gold.

1 Claim, No Drawings

METAL-TO-GLASS JOINT

The present invention relates to glass industry and, more particularly, to the compositions of glass which are capable of being sealed together with metals.

More specifically, the invention relates to seals between metal and glass.

The present invention may prove to be most advantageous in electronics, e.g., in chemotronics for the production of electrochemical cells with metallic lead-ins. Moreover, it may be useful for producing reliable electric vacuum seals.

To date the glass-to-metal seals, owing to their field of application, shall meet stringent requirements as to their reliability, strength, resistance to various aggressive media and, particularly, in the Age of Cosmomautics, resistance to repeated temperature gradients and radiation. The metal employed for producing such seals shall not oxidize readily under the effect of various physicochemical factors, it shall retain its structure. At the same time in the course of operation of the glass-to-metal seals and in sealing together the glass shall not dissolve the parent metal which, in turn, shall not react chemically with the glass, insofar as it usually results in failure of the glass-to-metal joint, deterioration of vacuum tightness of the seal and, hence, in a failure of the instrument wherein said seal has been utilized.

Known in the art is a seal between metal — silver — and glass, containing silicon oxide, boron oxide, aluminum oxide, zirconium dioxide, sodium oxide, potassium oxide, barium oxide, strontium oxide and titanium dioxide.

However, the known silver-to-glass seal does not feature adequate reliability through possible failure of the seal due to a too serious mismatch of coefficients of thermal expansion (CTE) of the glass and silver. Besides, the parent metal employed — silver — under certain aggressive environmental conditions is subject to partial surface dissolution which also adversely affects reliability, for example, of electrochemical cells.

The main object of the present invention is to provide such a seal between glass and metal which would be characterized by adequate mechanical reliability.

Another object of the invention is to provide a glass-to-metal seal which would be characterized by chemical stability — by a minimum solubility of the metal surface in glass and in aggressive mediums.

Still another object of the present invention is the provision of a glass-to-metal seal which would withstand repeated thermal gradients over a wide range of temperatures.

Said and other objects are accomplished by that in a seal between metal — silver — and glass containing silicon dioxide, aluminum oxide, zirconium dioxide, strontium oxide, sodium oxide and potassium oxide, according to the invention, the metal thermally sealed together with the glass in gold, and the composition of the glass additionally incorporates tungsten trioxide, lanthanum oxide and calcium oxide, the molecular weight percentage of the glass components being as follows: silicon dioxide, 60 to 62; aluminum oxide, 0.5 to 1; zirconium dioxide, 0.5 to 1.5; lanthanum oxide, 0.2 to 0.25; calcium oxide, 6 to 8; strontium oxide, 5 to 7; sodium oxide, 18.5 to 20.5; potassium oxide, 4.5 to 6.5 and tungsten trioxide, 1.5 to 2.

The gold-to-glass seal offered in the present invention features adequate mechanical reliability, i.e., it does not fail. Gold, as it is known, is resistant to all aggressive media; it does not change its structure and is not covered by an oxide film when exposed to repeated thermal effects which guarantees long-term service of the instrument wherein the above seal has been employed. Moreover, gold practically does not dissolve in glass and, hence, the metallic surface is not damaged.

Other objects and advantages of the present invention will become more fully apparent from a consideration of the following detailed description of exemplary embodiments thereof.

The seal of the invention has been provided under the assumption that gold is the most stable material which does not react chemically with the glass components, does not alter its original structure and properties under the effect of various factors, ensuring thereby long-term service of the instruments, wherein said glass-to-gold seal is employed.

Reliability and life of the glass-to-metal seals were known to be dependent on the following factors: coefficients of thermal expansion of the glass and metal should match closely over a temperature range of from 0° to 520°C; moreover, the curves showing the dependence of the coefficients of thermal expansion of temperature both for the metal and glass shall be similar (if not identical) in nature, by which virture failure of the seal may be precluded at any temperature within a range of from 0° to 520°C. (Electronic instruments do not find application above this temperature).

It has been established that the coefficient of thermal expansion of silver amounting to about $19 \cdot 10^{-6}$ deg$^{-1}$ (over a temperature range of from 0° to 520°C) does not agree with the mean coefficient of thermal expansion of the glass which does not provide for the fabrication of a coordinated glass-to-silver seal. As far as gold is concerned, the coefficient of thermal expansion of the metal is slightly lower being equal to $14.25 \cdot 10^{-6}$ deg$^{-1}$ (over a temperature range of from 0° to 520°C) and may agree with that of the glass of a certain composition.

Further, adequate glass-to-metal wetting is a prerequisite stipulating the production of a reliable, strong and, particularly, vacuum-strong seal between the metal and glass.

Investigations of crystallographic and crystalchemical characteristics — ionic radius ratios of the glass components and the parent metal as well as the experimental data obtained in measuring a wetting angle formed by a droplet of glass on the surface of the metal provided information needed to solve the problem of developing the glass which would feature adequate wetting of gold surface.

Moreover, we have developed the glass, according to the present invention, with a softening point close to a melting point of gold. In this case we have taken into account the fact that with the glass softening point matching too closely the gold melting point the thermal glass-to-metal technique is complicated, insofar as gold may melt off in sealing the process being accompanied by the evolution of gas bladders from molten metal which will further disturb vacuum tightness of the seal.

A too serious mismatch of the glass softening and metal melting points is also undesirable, since at the glass softening point the atoms of metal — gold — are not yet sufficiently movable to intrude by diffusion into interatomic and intermolecular space of the glass and, hence, the seal does not possess the requisite strength. If with the above serious mismatch of the glass softening and metal melting points the glass is heated to a temperature which is substantially higher than the glass softening point, glass ductility will diminish, this resulting in strains and local flows formed in the mass of the glass which, upon cooling, will give rise, in spite of thorough firing, to local stresses stipulating a reduction in seal strength and disturbance of its tightness.

With due regard for the foregoing, we have established that an optimum temperature for producing seals between glass and gold is 780°–760°C.

At a temperature lying within the above range the formation of a chemical bond (we assume it to be the Vander-Waals bond) is ensured, the atoms of the metal diffuse into a spatial lattice of the glass and electronic clouds of oxygen atoms, incorporated into the composition of the glass, are polarized by gold atoms or, which is less likely owing to inertness of the gold atoms, by its cations.

Thus, proceeding from theoretical considerations and experimental data, we have suggested the glass composition which in terms of its physicochemical and mechanical characteristics meets the specifications for a glass-to-gold seal.

According to the invention, the composition of the glass is as follows: silicon dioxide, 60 to 62 mol. percent; aluminum oxide, 0.5—1 mol. percent; sirconium dioxide, 0.5 to 1.5 mol. percent; strontium oxide, 5 to 7 mol. percent; sodium oxide, 18.5 to 20.5 mol. percent; potassium oxide, 4.5 to 6.5 mol. percent; tungsten trioxide, 1.5 to 2 mol. percent; lanthanum oxide, 0.2 to 0.25 mol. percent; calcium oxide, 6 to 8 mol. percent.

We suggest that the main glass-forming component — silicon dioxide — be introduced into the glass composition in amounts ranging from 60 to 62 mol. percent, insofar as we believe that an increase in silicon dioxide contents does not enable the production of a glass with the coefficient of thermal expansion amounting to about $130 \cdot 10^{-7}$ deg $^{-1}$. Moreover, the above contents of silicon dioxide contributes to the formation of a spatial lattice of the glass which displays sufficient resistance to various external physicochemical effects.

At a rise in alkali-metal oxide — sodium oxide — contents to more than 20.5 mol. percent the glass become chemically instable, whereas a decrease in sodium oxide content to less than 18.5 mol. percent does not make it possible to produce the glass featuring a coefficient of thermal expansion matching closely that of gold. The glass composition incorporates additionally another alkali-metal oxide — potassium oxide which, as it is known, enhances chemical durability of the glass, provided, however, that the potassium oxide content of the glass does not exceed 6.5 mol. percent.

Besides, to impart chemical stability to the glass, we have introduced into its composition the following chemically stable oxides: aluminum oxide, zirconium oxide and lanthanum oxide. In estimating the contents of the above-specified components the upper and lower limits have been established experimentally, taking into account theoretical considerations. Thus, an increase in the aluminum oxide content to more than 1 mol. percent, of zirconium dioxide — to more than 1.5 mol. percent and lanthanum oxide to more than 0.25 mol. percent diminishes materially the coefficient of thermal expansion of the glass but raises the glass softening and melting points, which naturally complicates glass sealing and melting techniques.

We suggest to introduce into the glass composition tungsten trioxide, insofar as the above component allows bringing together the curves showing the dependence of the coefficient of thermal expansion (CTE) on the temperature (T) of both gold and the herein-proposed glass composition.

However we believe that the introduction of tungsten trioxide in amounts exceeding 2 mol. percent results in the production of the glass whose glass CTE/T curve will differ widely from that for gold.

With the tungsten trioxide content less than 1.5 mol. percent, we have again observed the divergence of the CTE/T curves of the glass and gold.

Calcium and strontium oxides contribute to an enhancement of the coefficient of thermal expansion of the glass without impairing markedly its chemical characteristics.

However calcium oxide, when introduced into the glass composition in quantities exceeding 8 mol. percent, and strontium oxide contents exceeding 7 mol. percent adversely affect crystallizing properties of the glass.

Where the instruments in which the herein-proposed glass-to-gold seals are employed, operate in aggressive and hydrophobic environments, we recommend to coat the glass surface with silicon dioxide films which would afford the possibility of making the above seal still more reliable and strong in terms of its mechanical resistance and chemical stability.

EXAMPLE 1

A gold plate is thermally sealed together with a glass containing, in weight per cent: silicon dioxide, 53.89; tungsten trioxide, 5.12; aluminum oxide, 0.90; zirconium dioxide, 0.88; lanthanum oxide, 0.96; calcium oxide, 5.78; strontium oxide, 9.24; potassium oxide, 6.27 and sodium oxide, 16.96.

Upon testing the seal obtained we found that both the glass and the glass-to-gold seal produced are helium-tight and with the help of the above seal a high vacuum of up to $130 \cdot 10^{-6}$ n/m$^2$ can be created.

EXAMPLE 2

Tests of a gold-to-glass seal (the glass composition being as follows, in weight per cent: silicon dioxide, 52.27; tungsten trioxide, 6.03; aluminum oxide, 0.74; zirconium dioxide, 0.88; lanthanum oxide, 1.18; calcium oxide, 4.87; strontium oxide, 8.61; potassium oxide, 8.84; sodium oxide, 16.58) have shown the seal to be helium tight and that with the help of the above seal a high vacuum of up to $100 \cdot 10^{-5} - 130 \cdot 10^{-6}$ n/m$^2$ may be created.

EXAMPLE 3

A glass is manufactured containing, in weight per cent: silicon dioxide, 52.3; tungsten trioxide, 8.34; aluminum oxide, 1.61; zirconium dioxide, 1.06; lanthanum oxide, 0.23; calcium oxide, 5.36; strontium oxide, 7.46; potassium oxide, 6.11; sodium oxide, 16.82.

The glass obtained is thermally sealed together with a gold plate. The glass-to-gold seal is helium-tight and enables the creation of a high vacuum of up to $130 \cdot 10^{-6}$ n/m$^2$.

What I claim is:

1. A gold-to-glass joint containing silicon dioxide, 60 to 62 mol. percent; aluminum oxide, 0.5 to 1 mol. percent; zirconium dioxide, 0.5 to 1.5 mol. percent; strontium oxide, 5 to 7 mol. percent; sodium oxide, 18.5 to 20.5 mol. percent; potassium oxide, 4.5 to 6.5 mol. percent; tungsten trioxide, 1.5 to 2 mol. percent; lanthanum oxide, 0.2 to 0.25 mol. percent and calcium oxide, 6 to 8 mol. percent.

* * * * *